US007688686B2

(12) United States Patent
Polson et al.

(10) Patent No.: US 7,688,686 B2
(45) Date of Patent: Mar. 30, 2010

(54) ENHANCED TABLE OF CONTENTS (TOC) IDENTIFIERS

(75) Inventors: Michael J. Polson, North Bend, WA (US); Thomas B. Springer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1189 days.

(21) Appl. No.: 11/259,786

(22) Filed: Oct. 27, 2005

(65) Prior Publication Data

US 2007/0097802 A1 May 3, 2007

(51) Int. Cl.
G11B 21/08 (2006.01)
(52) U.S. Cl. .................. 369/30.07; 707/10; 707/102
(58) Field of Classification Search .............. 369/30.07, 369/30.04, 30.03, 30.01; 707/10, 102, 203, 707/100, 219, 104.1, 103 R, 6, 3; 704/231; 715/723, 810; 709/203
See application file for complete search history.

(56) References Cited

U.S. PATENT DOCUMENTS

| 5,822,583 | A |   | 10/1998 | Tabuchi |  |
|---|---|---|---|---|---|
| 5,873,097 | A | * | 2/1999 | Harris et al. | ................. 707/203 |
| 6,118,450 | A |   | 9/2000 | Proehl et al. |  |
| 6,185,527 | B1 |   | 2/2001 | Petkovic et al. |  |
| 6,236,395 | B1 |   | 5/2001 | Sezan et al. |  |
| 6,453,336 | B1 |   | 9/2002 | Beyda et al. |  |
| 6,453,339 | B1 |   | 9/2002 | Schultz et al. |  |
| 6,748,360 | B2 |   | 6/2004 | Pitman et al. |  |
| 6,760,721 | B1 |   | 7/2004 | Chasen et al. |  |
| 6,772,408 | B1 |   | 8/2004 | Velonis et al. |  |
| 6,781,935 | B1 |   | 8/2004 | Kori et al. |  |
| 7,043,473 | B1 |   | 5/2006 | Rassool et al. |  |
| 7,043,525 | B2 |   | 5/2006 | Tuttle et al. |  |
| 7,065,527 | B2 | * | 6/2006 | McCartney et al. | ........... 707/10 |
| 7,136,866 | B2 | * | 11/2006 | Springer et al. | ............. 707/102 |
| 2001/0031066 | A1 |   | 10/2001 | Meyer et al. |  |

(Continued)

FOREIGN PATENT DOCUMENTS

CA    2483104 A1    11/2003

(Continued)

OTHER PUBLICATIONS

Dixon, Simon, et al., *MATCH: A Music Alignment Tool Chest*, 2005, 8 pages, Queen Mary, University of London, London, England.

(Continued)

*Primary Examiner*—Ali Neyzari
(74) *Attorney, Agent, or Firm*—Senniger Powers LLP

(57) ABSTRACT

A method for identifying the contents of a compact disc manipulating a received table of contents (TOC) identifier associated with the compact disc. The method parses portions of the TOC comprising a series of numbers corresponding to track offsets for each track of the compact disc. The method further determines the first number from the series of numbers, subtracts the first number from each number in the series of numbers to form an altered series of numbers, and concatenates the altered series of numbers to form an altered string that comprises the altered TOC identifier. The altered TOC identifier may then be compared to a plurality of canonical TOC identifiers to identify the contents of the compact disc. Another method generates a generic TOC identifier for a plurality of compact discs known to contain the same data.

20 Claims, 9 Drawing Sheets

U.S. PATENT DOCUMENTS

| | | |
|---|---|---|
| 2002/0028000 A1 | 3/2002 | Conwell et al. |
| 2002/0055951 A1 | 5/2002 | Shigetomi et al. |
| 2002/0055970 A1 | 5/2002 | Noro |
| 2002/0059584 A1 | 5/2002 | Ferman et al. |
| 2002/0069218 A1 | 6/2002 | Sull et al. |
| 2002/0099737 A1 | 7/2002 | Porter et al. |
| 2002/0103920 A1 | 8/2002 | Berkun et al. |
| 2002/0120634 A1 | 8/2002 | Min et al. |
| 2002/0178276 A1 | 11/2002 | McCartney et al. |
| 2002/0178410 A1 | 11/2002 | Haitsma et al. |
| 2003/0005430 A1 | 1/2003 | Kolessar |
| 2003/0036948 A1 | 2/2003 | Woodward et al. |
| 2003/0093790 A1 | 5/2003 | Logan et al. |
| 2003/0112729 A1 | 6/2003 | Nichols et al. |
| 2003/0135513 A1 | 7/2003 | Quinn et al. |
| 2003/0195851 A1 | 10/2003 | Ong |
| 2003/0236582 A1 | 12/2003 | Zamir et al. |
| 2004/0006607 A1 | 1/2004 | Kanada et al. |
| 2004/0034441 A1 | 2/2004 | Eaton et al. |
| 2004/0059795 A1 | 3/2004 | Ramey |
| 2004/0086268 A1 | 5/2004 | Radha et al. |
| 2004/0098398 A1 | 5/2004 | Ahn et al. |
| 2004/0133548 A1 | 7/2004 | Fielding et al. |
| 2004/0260682 A1 | 12/2004 | Herley et al. |
| 2005/0055372 A1 | 3/2005 | Springer, Jr. et al. |
| 2005/0099921 A1 | 5/2005 | Selve et al. |
| 2005/0141711 A1 | 6/2005 | Inoue et al. |
| 2005/0278726 A1 | 12/2005 | Cano et al. |
| 2006/0271989 A1 | 11/2006 | Glaser et al. |

FOREIGN PATENT DOCUMENTS

| | | |
|---|---|---|
| CA | 2499967 A1 | 4/2004 |
| WO | WO 01/15018 A2 | 3/2001 |
| WO | WO 01/45103 A1 | 6/2001 |

OTHER PUBLICATIONS

Intermedia Design, *Helium Music Manager—Search and Browse your music collection*, 5 pages, accessed Oct. 27, 2005 at http://www.helium2.com/guide_3.php.

Lemström, Kjell, *Press Release for String Matching Techniques for Music Retrieval*, Public Defense of Ph.D. Dissertation, Nov. 24, 2000, 5 pages, accessed Oct. 27, 2005 at http://www.cs.helsinki.fi/u/klemstro/THESIS/, University of Helsinki, Helsinki, Finland.

\* cited by examiner

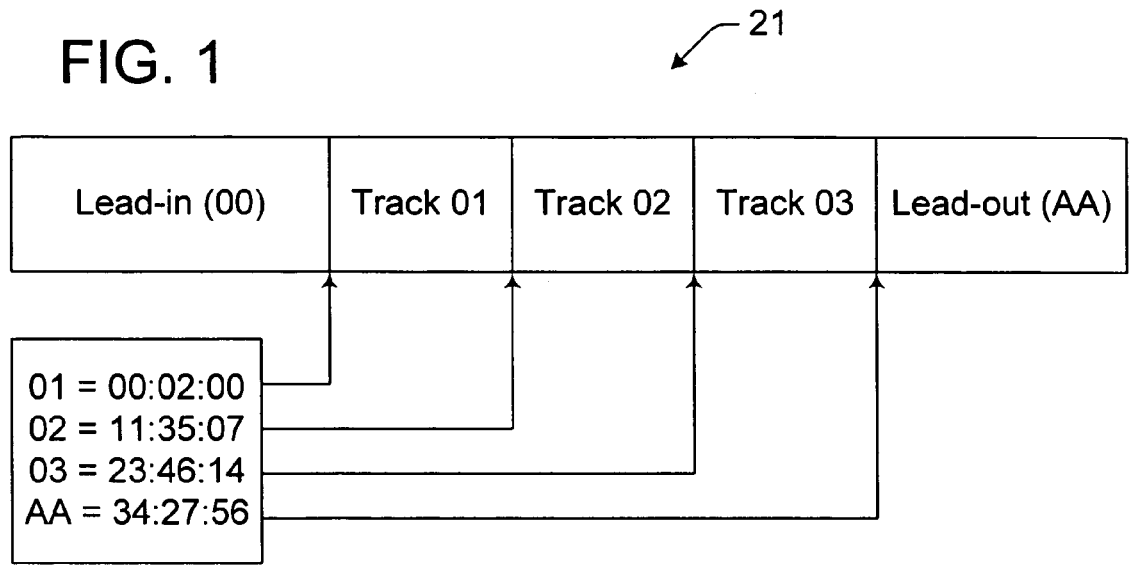

| receiving a table of contents (TOC) identifier associated with a compact disc (e.g., from a user accessing the contents of the compact disc), the TOC identifier comprising a string formed by the concatenation of a number (e.g., hexadecimal or integer) indicative of the number of tracks on the compact disc, a series of numbers corresponding to track offsets for each track of the compact disc, and a number indicative of the lead out value of the tracks on the compact disc | 37 |

↓

| parsing the string into the number indicative of the number of tracks on the compact disc, the series of numbers corresponding to track offsets for each track of the compact disc, and a number indicative of the lead out value of the compact disc | 27 |

↓

| determining the first number from the series of numbers | 29 |

↓

| subtracting the first number from each number in the series of numbers to form an altered series of numbers | 33 |

↓

| rounding (e.g. up) each of the numbers in the altered series of numbers and rounding an intertrack gap between each of the tracks to a value common with the intertrack gap of the canonical TOC identifiers | 49 |

↓

| concatenating the altered series of numbers to form an altered string that comprises the altered TOC identifier | 35 |

↓

| comparing the altered TOC identifier to a plurality of canonical TOC identifiers, each of the canonical TOC identifiers associated with a particular album, to identify the contents of the compact disc | 39 |

↓

| identifying the contents of the compact disc to the user | 41 |

↓

| providing metadata associated with the compact disc to the user | 43 |

55 — collecting a plurality of TOC identifiers stored on a plurality of compact discs known to contain the same data, each of the TOC identifiers comprising a string formed by the concatenation of a number indicative of the number of tracks on the compact disc, a series of numbers corresponding to track offsets for each track of the compact disc, and a number indicative of the lead out value of the tracks on the compact disc

75 — comparing the plurality of TOC identifiers

77 — identifying outlier TOC identifiers (e.g., identifying those TOC identifiers where the number indicative of the number of tracks on the compact disc is different than the mode of the number indicative of the number of tracks on the compact disc for the plurality of TOC identifiers)

79 — removing the identified outlier TOC identifiers from the parsing and the aggregating

59 — parsing the string into the number indicative of the number of tracks on the compact disc, the series of numbers corresponding to track offsets for each track of the compact disc, and a number indicative of the lead out value of the compact disc

63 — aggregating each of the respective series of track offset numbers for each TOC identifier with the corresponding track offset numbers from the other of the plurality of collected TOC identifiers (e.g., weighting one or more of the aggregated track offset numbers according to the popularity of the respective TOC identifier)

67 — creating a track offset range for each track, or two or more ranges, (e.g., at least about 2/15 of a second or at least about 1/3 of a second) on the plurality of compact discs based upon the aggregated track offset population corresponding to each track (e.g., utilizing the standard deviation of each aggregated track offset population to determine each respective range or super-sampling the aggregated track offset population (e.g., at a level of granularity larger than the granularity of the collected individual TOC identifiers))

71 — combining the track offset range for each track to create the generic TOC identifier

ENHANCED TABLE OF CONTENTS (TOC) IDENTIFIERS

BACKGROUND

Conventional online systems provide metadata services to enable rich media player experiences and media management capabilities. For example, a user may access a compact disc (CD) with a media player (e.g., Windows Media Player) and the media player may subsequently display the album name, the artist name, track information for the accessed CD, and other information related to the CD. Such a conventional system functions because when the CD is accessed by the media player, a Table of Contents (TOC) identifier, or TOC, is extracted from the CD and forwarded to an online service. The online service then utilizes the TOC as the key to accessing a reference database from which related metadata is retrieved. This metadata is then transmitted back to the user for many purposes, such as informational display and media management.

Online TOC identifier matching services receive millions of requests for CD metadata initiated by CD first inserts daily. Unfortunately, less than half of these are served with metadata because no matching TOC identifier is stored in the matching service database. For a given "album", there may be multiple TOC identifiers from multiple CDs. TOC identifiers do not match for a variety of reasons, including (i) multiple CD pressings and releases, each having slightly different timing offsets for the CD tracks, (ii) duplicate copies of CDs whereby software and hardware differences in duplication equipment produce slightly different TOCs; (iii) rare CDs (e.g., international CDs or independent label CDs) for which no TOC identifier data provider or other data provider (e.g., user feedback) is available, (iv) CDs purchased and burned from an online store (e.g., Napster), among others. The TOC identifiers stored on CDs are a precise measurement of the offsets, or starting points, of each track on a CD. Due to slight variations in hardware and software mastering and duplication equipment, these TOC identifiers can very slightly from one another. Thus, to be able to identify a CD, the online service noted above must first have a copy of each TOC identifier in a reference database. However, there is no definitive source to obtain this information. Thus, many TOC identifiers sent from users to online services cannot be matched to a particular album, inhibiting conventional systems from providing related metadata to many users. Moreover, much of this conventional matching is performed on an exact or semi-exact basis, increasing the likelihood of failed matches due to small variations between TOC identifiers. A way to successfully match TOC identifiers without requiring a perfect match to another TOC identifier would be useful.

SUMMARY

The following simplified summary provides a basic overview of some aspects of the present technology. This summary is not an extensive overview. It is not intended to identify key or critical elements or to delineate the scope of this technology. This Summary is not intended to be used as an aid in determining the scope of the claimed subject matter. Its purpose is to present some simplified concepts related to the technology before the more detailed description presented below.

Accordingly, methods for identifying the contents of storage media are disclosed. The methods may comprise receiving an identifier associated with a storage media and manipulating the identifier to alter the identifier. The method may then comprise comparing the altered identifier with a canonical identifier to identify the contents of the storage media. Other methods generate a generic identifier by collecting a plurality of identifiers and aggregating them to create ranges of acceptance for the generic identifier.

BRIEF DESCRIPTION OF THE DRAWINGS

FIG. 1 is a diagram of a TOC identifier of one embodiment invention;

FIG. 2 is a flow diagram of a method of one embodiment of the invention;

FIG. 3 is a flow diagram of a method of another embodiment of the invention;

Corresponding reference characters indicate corresponding parts throughout the drawings.

DETAILED DESCRIPTION

Figure 4:
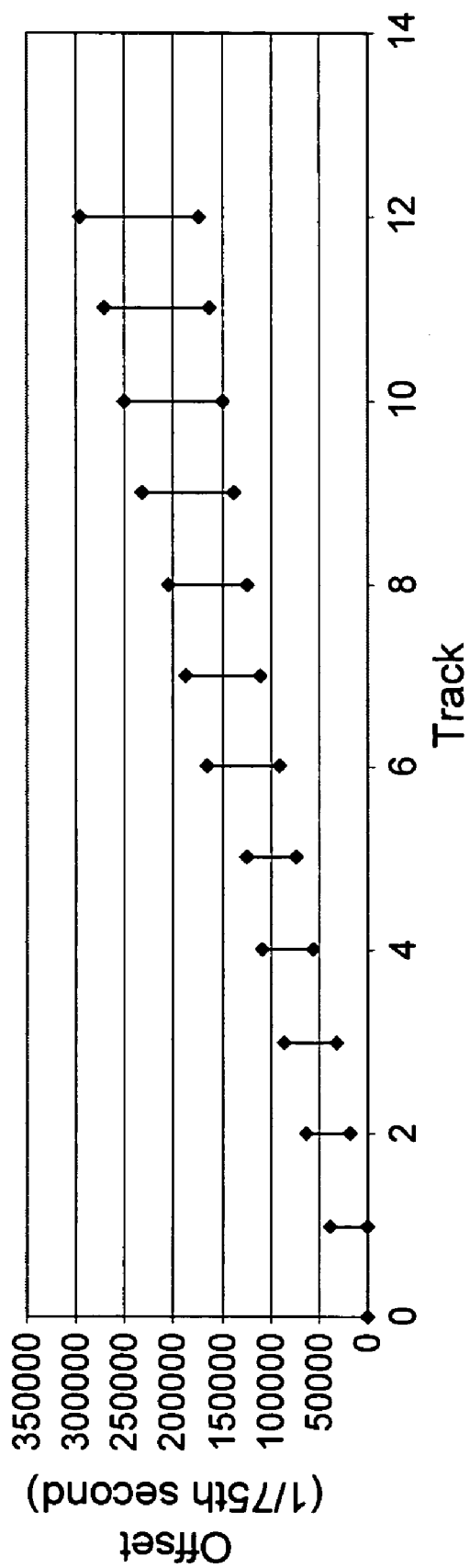
FIG. 4 is an exemplary chart depicting an offset range distribution by track.

Compact discs contain a finite amount of storage space. The usage of this space is generally defined by a TOC identifier stored upon the compact disc. Although discussions herein will be generally directed to TOC identifiers utilized with CDs, the features discussed herein may be readily adapted to other media, such as compact discs with different amounts of storage space, Digital Video Discs (DVDs), and any other storage media where identification of data contents is of potential importance. For example, the TOC space of a particular CD may be thought of as the range of offsets, or divisions, which can exist on a physical CD. In the discussion herein, such offsets are taken to be $\frac{1}{75}$th of a second each, whereby an 80 minute CD may contain 75 offsets per second, or 360,000 distinct offsets. Other types of CDs, such as Red Book Audio CDs, may have different lengths with correspondingly different numbers of offsets (e.g., 74 minutes, 333,000 offsets). As would be readily understood by one skilled in the art, the features of the described embodiments may be readily applied to other alternative embodiments including CDs and other storage media having different lengths or differently defined offsets without departing from the scope of the invention.

A TOC identifier, or TOC, is read from the CD and provided in a RAW TOC format. The following is an example of a RAW TOC format in hexadecimal base:

5+96+529E+9F88+F192+1298C+143F6

More generally, the structure of a RAW TOC may be given by the following and is shown generally as 21 in FIG. 1:

n+T1+T2+T3+ ... +Tn+L where
n=Number of tracks,
$T_n$=Track offset (track number n), and
L=Lead Out value.

The number of tracks is expressed as a positive integer representing the number of tracks on the compact disc. The track offsets ($T_n$) and lead out values are times expressed as positive integers corresponding to the number of 1/75ths of a second. For example, the track offset of the first track of the example noted above is 96 in hexadecimal base, which is equal to 150 in decimal base, or $^{150}/_{75}$ seconds (two seconds). A structured query language user-defined function (SQL UDF) for converting a hexadecimal string to an integer string is depicted in Appendix A. Likewise, the track offset of the second track is 529E in hexadecimal base, which is equal to 21,151 in decimal base, or $^{21,151}/_{75}$ seconds, or about 282 seconds. In the example shown in FIG. 1, the RAW TOC 21 includes a first offset of 2 minutes, a second offset of 11:35:07, a third offset of 23:46:14, and a fourth offset of 34:27:56.

Conventionally, for improved TOC matching, the RAW TOC may be converted into a Microsoft® TOC, or MS TOC, format. Converting the RAW TOC to an MS TOC comprises removing n (the number of tracks), zero padding each track offset number to a length of six digits with leading zeros (e.g., 529E becomes 00529E), and removing the lead out value. The track offset numbers may then be concatenated to form the following MS TOC corresponding to the above-noted RAW TOC:

00009600529E009F8800F19201298C

These MS TOCs may be used for conventional matching of TOCs. Such matching requires an exact match of the above MS TOC string to the MS TOC calculated from the RAW TOC provided by the accessed CD. If any of the offsets are off by as little 1/75th of a second, however, the TOC identifiers will not register as a match so that no metadata is identified for transfer to the user.

The following example demonstrates these issues with such conventional exact matching. The following MS TOC is based upon a RAW TOC stored on a commercially available CD:

0000C80048EE009512010775015B71019A2301F-493024F1A028D6302F3B9

In contrast, the following MS TOC is based upon a RAW TOC stored on a duplication of the commercial CD:

0000960048BC0094E0010743015B3F0199F101F-461024EE8028D3102F387

Obviously, the MS TOC identifiers are not identical, although the CDs contain the same songs from the same album. The duplicated CD, therefore, may not be detected as a match based upon the MS TOC of the commercial CD, even though the album content is the same.

With this example there is a logical explanation for the difference between the two MS TOCs. The offsets of each TOC are identically spaced with respect to one another, the only difference between the TOCs being the starting point of each series of offsets. The following table depicts the offsets for each track of the commercial CD and the duplicated CD. Note that for the first track, the Commercial CD has an offset of 200, while the duplicated CD has an offset of 150, a difference of 50 offsets, or 2/3 of a second. The remaining tracks follow this same pattern. Thus, even though the offsets of the original CD and the duplicated CD do not match, shifting the first track of each CD to zero time and then shifting the remaining tracks by respective shifts will yield matching zero-based offsets, as shown below.

| Track | Commercial CD | Commercial CD (0 - based) | Duplicated CD | Duplicated CD (0 - Based) |
|---|---|---|---|---|
| 1 | 200 | 0 | 150 | 0 |
| 2 | 18670 | 18470 | 18620 | 18470 |
| 3 | 38162 | 37962 | 38112 | 37962 |
| 4 | 67445 | 67245 | 67395 | 67245 |
| 5 | 88945 | 88745 | 88895 | 88745 |
| 6 | 104995 | 104795 | 104945 | 104795 |
| 7 | 128147 | 127947 | 128097 | 127947 |
| 8 | 151322 | 151122 | 151272 | 151122 |
| 9 | 167267 | 167067 | 167217 | 167067 |
| 10 | 193465 | 193265 | 193415 | 193265 |

Zero Offset Matching

Building upon the offset example noted above, in one exemplary method, the previously acquired TOC identifiers are each converted to such an altered TOC identifier having a zero-based offset and stored in the reference database. In particular, the method, generally indicated 25 in FIG. 2 comprises parsing, at 27, the string of the TOC identifier into the series of numbers and determining, at 29, the first number in the series of numbers. The method further comprises subtracting, at 33, the first number from each number in the series of numbers to form an altered series of numbers. The method further comprises concatenating, at 35, the altered series of numbers to form an altered string that comprises the altered TOC identifier. Thus, when an incoming TOC identifier request does not find an exact match with a conventional MS TOC identifier, the incoming TOC identifier may then be matched against the zero-based representation. If such a zero-based match is made, it may be considered high confidence.

The method may further comprise receiving, at 37, a table of contents (TOC) identifier associated with a compact disc (see FIG. 2). Generally, the TOC identifier comprises a string formed by the concatenation of a number indicative of the number of tracks on the compact disc, a series of numbers corresponding to track offsets for each track of the compact disc, and a number indicative of the lead out value of the tracks on the compact disc.

The method may further comprise comparing, at 39, the altered TOC identifier to a plurality of canonical TOC identifiers, each of the canonical TOC identifiers associated comprise particular album, to identify the contents of the compact disc. The method may further comprise identifying, at 41, the contents of the compact disc to the user, thereby providing the contextual experience discussed above, such as through providing, at 43, metadata associated with the compact disc to the user Varying Inter-Track Gaps A gap is typically present between each track on a compact disc. But the length of these gaps between tracks can vary from one CD to another, even for the same album. To understand and compensate for this additional potential difference between TOC identifier offsets, the track gaps from different TOCs may be rounded-up, at 49, to a similar value for each track segment so that the resultant TOCs are not precisely matching the contents of the CD, but may be applied generally to other similarly adjusted TOC identifiers.

In one example of such a rounding process, the first track of two TOC identifiers are set to zero and the length of the first track on both TOC identifiers is 18,000, making the second track offset 18,000. The second track of such TOCs share the same value of 22,500, but one TOC uses a 150 segment offset (2 seconds), while the other TOC uses a 225 segment offset (3 seconds), making the third track offsets different, namely 40,650 and 40,725, respectively. To account for this difference in intertrack gaps, both gaps are rounded upward, also at 49, to 750 (10 seconds). With the rounding 49, the third track offset for each TOC is 41,250. By rounding the remaining intertrack gaps in a similar manner, the TOCs may be altered to properly match one another. A TOC identifier matching such an altered TOC may be assigned a lower confidence level than an exact match, to reflect the fact that an exact match was not found.

Generating Generic TOCs with Offset Ranges

In an alternative embodiment, the aggregation of multiple TOC identifiers associated with one album may be facilitated by establishing a range of offsets for each track that will encompass many, or all, of the known TOC identifiers which have been mapped to a particular album. Such a method, also generally indicated 51 in FIG. 3, is designed to generate a generic table of contents (TOC) identifier for a plurality of compact discs known to contain the same data adapted for matching with a TOC identifier stored on an unknown compact disc for identifying the contents of the unknown compact disc. The method comprises collecting, at 55, a plurality of TOC identifiers stored on a plurality of compact discs known to contain the same data, each of the TOC identifiers comprising a string formed by the concatenation of a number indicative of the number of tracks on the compact disc, a series of numbers corresponding to track offsets for each track of the compact disc, and a number indicative of the lead out value of the tracks on the compact disc. The method further comprises parsing, at 59, the string into the number indicative of the number of tracks on the compact disc, series of numbers corresponding to track offsets for each track of the compact disc, and a number indicative of the lead out value of the compact disc. The method further comprises aggregating, at 63, each of the respective series of track offset numbers for each TOC identifier with the corresponding track offset numbers from the other of the plurality of collected TOC identifiers. The method also comprises creating, at 67 a track offset range for each track on the plurality of compact discs based upon the aggregated track offset population corresponding to each track and combining, at 71, the track offset range for each track to create the generic TOC identifier.

The conventional use of a single offset for each track to correspond with all TOC identifiers associated with a given album (e.g., track 1 offset=20,585) demands precision down to the length of a single offset (e.g., 1/75th of a second). This provides for precise matching, but may sometimes cause an unnecessary loss of a TOC identifier match. In contrast, the method discussed above creates 67 a track offset range for each track (e.g., a track 1 offset range between 21,000 and 24,000) to better encompass more track offsets from different TOC identifiers. For each track, a given range is created 67, such that any TOC identifier having track offsets corresponding to the ranges would constitute a matching TOC identifier. This correspondence between the offsets ranges and the offsets of each TOC identifier may be required to be absolute (e.g., each TOC offset falls within the appropriate range) or somewhere less than absolute (e.g., eighty percent of the offsets fall within the appropriate ranges). For the example of FIGS. 4-6, the offset ranges for several of the tracks on the album may be as follows:

| Track Number | Bottom of Range | Top of Range |
|---|---|---|
| 1 | 0 | 38,500 |
| 2 | 16,800 | 62,800 |
| 3 | 30,900 | 84,000 |
| 4 | 55,800 | 108,700 |
| . . . | . . . | . . . |

Thus, for a given TOC identifier to match these offset ranges, the required number (e.g., all) of track offsets of the TOC identifier must fall within the given ranges. For example, a TOC identifier with first through fourth track offsets of 15,000, 32,000, 49,000, and 69,000, respectively, would be a match, assuming that the remaining offsets for tracks 5-12 fall within the given ranges. In another example, a TOC identifier with first through fourth track offsets of 14,000, 28,000, 41,000, and 54,000, respectively, would not be a match because the fourth offset, 54,000, falls outside the range of 55,800 to 108,700. Such offset ranges may be further refined and tuned to minimize false positives. For example, the ranges given in the above exemplary table may be too large, such that incorrect TOC identifiers may be deemed matches. For example, the offset range for track four is between about 12 minutes and about 24 minutes. This range may capture too many possible TOC identifiers and may need to be narrowed (e.g., from about 76,000 (17 minutes) to about 86,000 (19 minutes)) to appropriately balance the competing goals of increasing matching, yet minimizing false positives. Generally, then, the offset ranges may be adjusted to be as small as possible for the purpose of yielding a unique match and minimizing false positives, while not restricting the ability of the offset ranges to identify a newly acquired input TOC identifier of unknown identity.

In another alternative embodiment, the standard deviation of the data of a particular offset may be utilized to intelligently create, also at 67, the range an amount designed to maximize matches and minimize false positives (e.g., ranges defined by one, two, three, four, five, six standard deviations or any multiple or fraction thereof are contemplated as within the scope of the claimed invention). Other tools for intelligently create and tune the size of the ranges are also contemplated as within the scope of the invention.

In yet another alternative embodiment, the aggregating 63 may further comprise weighting, also at 63, an individual TOC identifier's data points based upon the popularity of the TOC identifier. TOC identifiers may be given a weight based upon how often they are submitted as an input TOC identifier in a request for metadata. Each of the offset ranges may be tuned based upon the most popular TOC identifiers being submitted for matching. This minimizes false negatives because the offset range is tuned for the most commonly expected input TOC identifiers.

It should also be noted here that two or more offset ranges for one or more of the track offsets may be created, also at 67, based upon the aggregated track offset population corresponding to each track, where the data warrants it (e.g., bimodal distribution, trimodal distribution, etc.) and more than one specific offset range is likely to produce more correct matches. For example, the offset distribution for track 1 depicted in FIG. 6 may be usefully modeled by having two offset ranges, each associated with a particular data grouping (e.g., from 22335 to 22380 (4.9633 to 4.9733 minutes) and from 22480 to 22530 (4.9956 to 5.0067 minutes)).

Generating Generic TOCs with Super-Sampling

To address the issue of exact matching missing some potential matches due to unnecessarily high precision matching, another exemplary method performs TOC identifier matches at a level of granularity larger than the individual 1/75th second segments. Generally, this reduces reliance on the precision of traditional TOC identifiers and relies upon the less precise, yet combinatorial, nature of multiple tracks on a single CD to maintain unique TOC matches. In other words, a wider range of offsets for each track will be accepted as matching, and the combination of the offsets for each of the tracks per CD will maintain the individuality of TOC identifiers and minimize false positives. The increased sampling granularity intentionally makes the TOC identifiers less precise, so that more matches occur.

TOC identifiers sampled at a larger granularity may be considered TOCs that are super-sampled. Super-sampling is a signal processing technique which effectively smoothes out higher frequency variations by sampling at a lower resolution. With TOC identifiers, for example, sampling TOC identifier offset distributions (e.g., FIGS. 5 and 6) at a slightly lower frequency will blur the edges of the offset ranges and allow the distributions to be more useful in matching with a variety of TOC identifiers. This process is particularly useful for increasing the potential match rate for TOC identifiers forming part of a population of statistically valid samples (e.g., popular albums).

Figure 6:
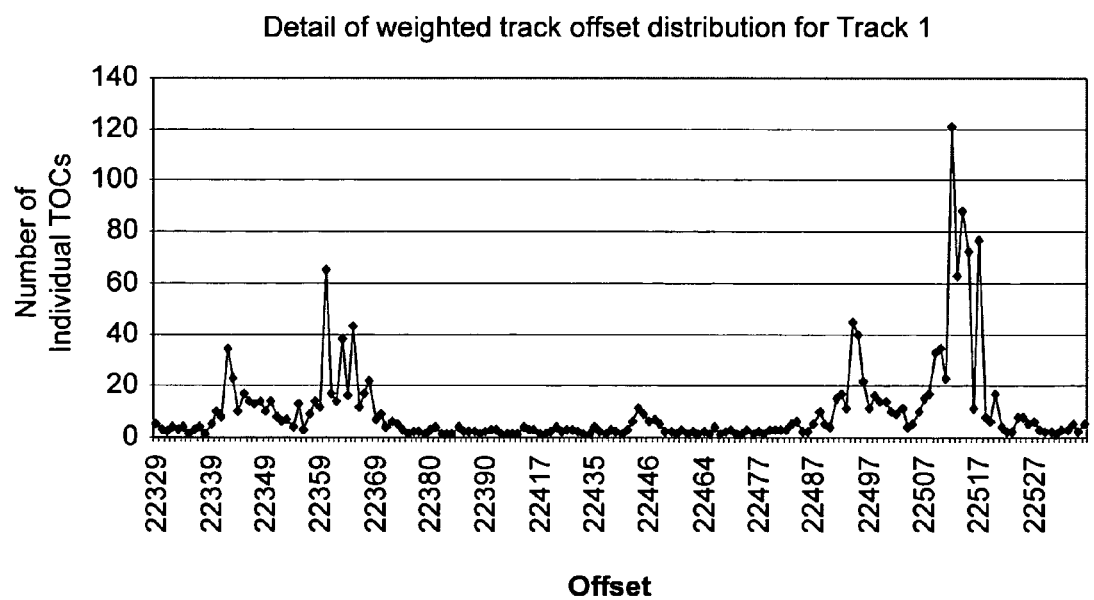
FIG. 6 is an exemplary chart depicting further detail of the chart of FIG. 5.
Figure 7:
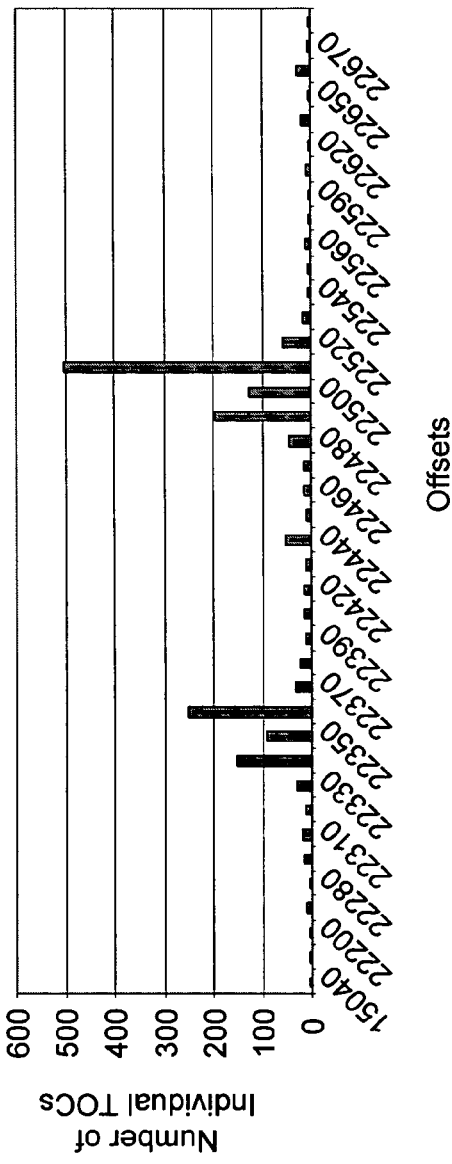
FIG. 7 is an exemplary chart depicting an aggregation of track one offsets super-sampled in 10 segment increments.

For example, referring to FIG. 7, the mode of the first track offset is 22510 when the TOCs are super-sampled with 10/75th second segments (0.13 second), rather than 1/75th second segments (0.013 second). Thus, any TOC identifier having a first track offset between 22505 and 22514 will be considered as a potential match. Thus, rather than capturing only 121 potential matching TOCs, as shown in FIG. 6, super-sampling at the 10/75th second segment interval increases the number of potential matches to 505 potential matching TOCs, as shown in FIG. 7.

Figure 8:
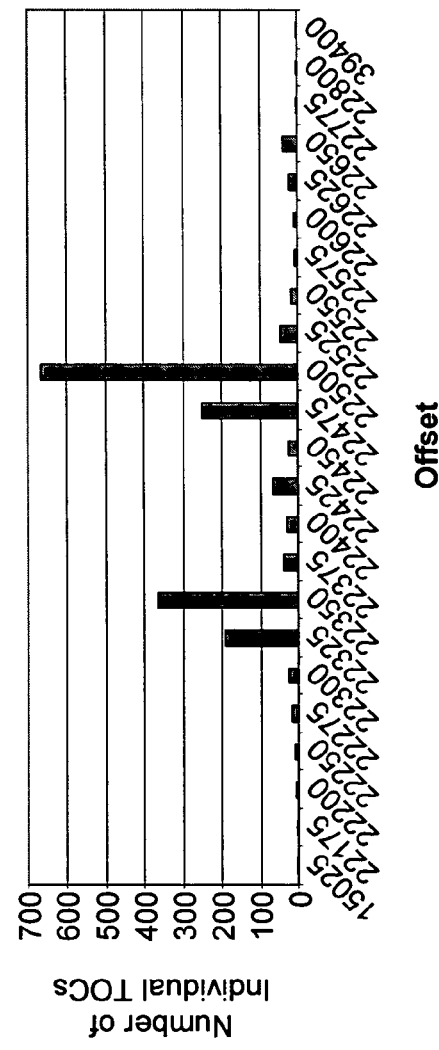
FIG. 8 is an exemplary chart depicting an aggregation of track one offsets super-sampled in 25 segment increments.

In another alternative embodiment depicted in FIG. 8, the mode of the first track offset is 22500 when the TOCs are super-sampled with 25/75th second segments (0.33 second), rather than 1/75th second segments (0.013 second). Thus, any TOC identifier having a first track offset between 22488 and 22513 will be considered as a potential match. Thus, rather than capturing only 121 potential matching TOCs, as shown in FIG. 6, super-sampling at the 25/75th second segment interval increases the number of potential matches to 665 potential matching TOCs, as shown in FIG. 8. One skilled in the art would readily understand the other alternative embodiments, such as other super-sampling segment intervals, may be utilized without departing from the scope of the invention.

When sampling at a larger level of granularity, the method may also minimize potentially ambiguous matches by not relying upon those TOC identifiers that when sampled at a lower frequency than individual 1/75th second segments are no longer unique and could match to more than one album (e.g., albums with very few tracks). Where two candidate albums overlap at each track offset for a given sampling interval, popularity weighting could be used to determine which TOC is the likely match.

Identifying and Removing Outlying TOC Identifiers

The TOC identifier identifies the number of tracks on the physical compact disc. Thus, all TOC identifiers associated with a particular album should share the same number of tracks. In practice, however, many different TOCs mapped to a particular album will have many different numbers of tracks associated with the album. The following example demonstrates the variation of between TOC identifiers mapped to a popular 10-track album:

| Number of Tracks | Number of Individual TOC Identifiers with that Number of Tracks |
|---|---|
| 10 | 708 |
| 11 | 32 |
| 16 | 17 |
| 15 | 15 |
| 9 | 11 |
| 18 | 11 |
| 13 | 10 |
| 14 | 10 |
| 17 | 10 |
| 12 | 9 |
| 2 | 9 |
| 19 | 3 |
| 20 | 2 |
| 5 | 2 |
| 6 | 1 |
| 7 | 1 |
| 8 | 1 |
| 3 | 1 |
| 23 | 1 |
| 28 | 1 |

Figure 9:
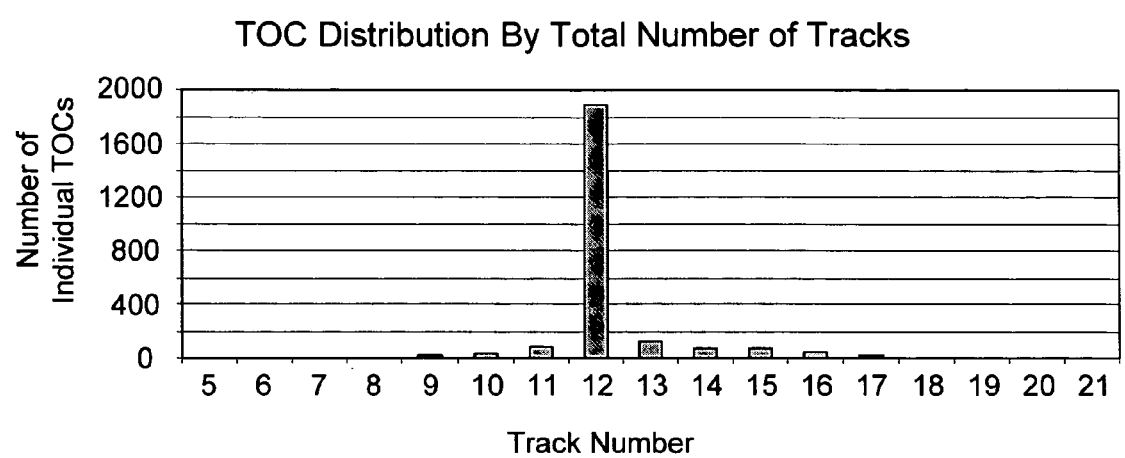
FIG. 9 is an exemplary chart depicting TOC distribution by total number of tracks.

In another alternative embodiment depicted in FIG. 9, the distribution of TOC identifiers by track listing is shown. In this example, the mode of the sample is twelve tracks, which is strong evidence that the album likely has twelve tracks. By comparing, at 75 (FIG. 3), the plurality of TOC identifiers, the TOC identifiers having total track numbers very different from the mode (e.g., 3 tracks, 28 tracks, etc.) may be defined and identified, at 77 (FIG. 3), as outliers because these single observations are considered too different from the rest of the data. In accordance with the examples discussed above, the method 51 of FIG. 3 may further comprise removing, at 79, the identified outlier TOC identifiers where the number indicative of the number of tracks on the compact disc is different than the mode of the number indicative of the number of tracks on the compact disc for the plurality of TOC identifiers.

Once the clearly outlying TOC identifiers without the correct number of tracks are removed, the remaining TOC identifiers may be aggregated 63 as discussed above. For example, referring now to FIG. 4, this graph depicts the ranges of non-weighted offsets reported by the various TOCs for each track. For example, for track 1, the offsets range from 0 segments (0 seconds) to about 40,000 segments (9 minutes), a difference of about 9 minutes between the largest and the smallest offset. Clearly, not all offsets for track 1 match, or are close to one another. For higher number tracks the range of offsets is even broader. For example, for track 12, the offsets range from about 175,000 segments (39 minutes) to about 295,000 segments (66 minutes), a difference of about 27 minutes between the largest and the smallest offset. Thus, as total play time and track numbers increase, the range of values exhibited by different TOC identifiers also increases.

Figure 5:
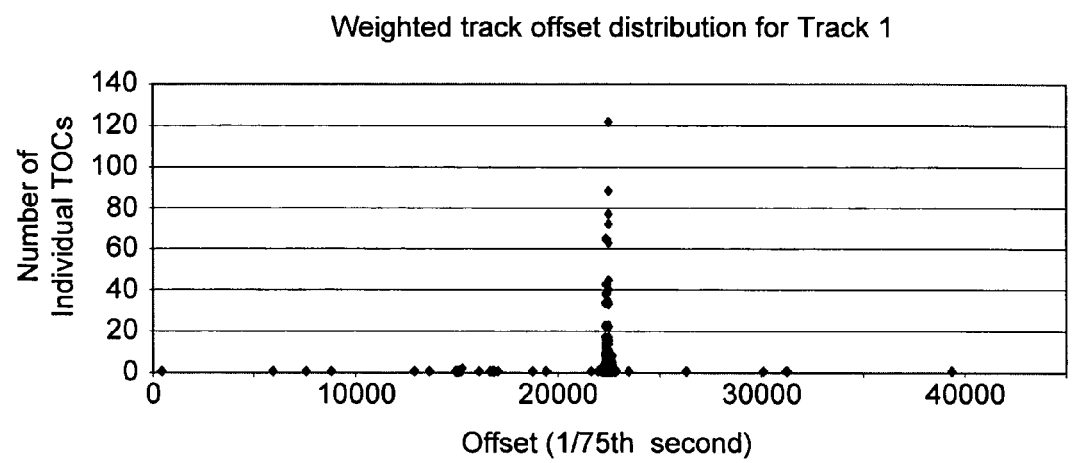
FIG. 5 is an exemplary chart depicting a weighted track offset distribution for track 1.

Thus, for each track offset, a wide range of observed track offsets is typically encountered. Turning to FIG. 5, the track offsets for track 1 of the above-noted example are shown. Many of the offsets are equal to about 22,500 segments (5 minutes). FIG. 6 depicts a further magnification of this concentration, demonstrating that there is still a great difference between the offsets provided by individual TOCs. Because of this inherent variation between TOC identifiers, exact matching of TOCs to one another will obviously lead to a failure to match many of the TOC identifiers. As total play time and track numbers increase, the concentration of offset values can be expected to become even more diffuse as differences between TOCs are magnified due to the compounding of differences with respect to each track.

As would be understood by one skilled in the art, any statistical method for removing outliers may be utilized without departing from the scope of the invention.

Weighting

For albums where there is not a large enough set of TOC identifier matches to build a statistical model of the TOC identifier, TOC request popularity may also be incorporated as a weighting factor. As used herein, TOC popularity is the number of times metadata for a given TOC is requested on a daily basis by users of a TOC matching service. Other measures of TOC identifier popularity may also be used without departing from the scope of the invention. For example, a first TOC identifier with ten times more requests than a second TOC identifier may be given a greater weight because of its relative popularity. Specific data provider TOC identifier associations may also be given a higher weight due to their inherent reliability. For example, a TOC association from AMG may be given ten times the weight of a single user feedback association because of its inherent reliability over a TOC identifier from a single user. Such popularity weightings may be implemented with any of the TOC identifier identification methods disclosed herein as a way to weight the relative importance of any TOC identifier matched to an album and to build a more sophisticated weighting model for identifying the TOC identifiers.

In one alternative embodiment, only those TOC identifiers associated with the mode of the population, which is presumably the correct number of tracks, will be used in combining the track offset range for each track to create the generic TOC identifier. In yet another alternative embodiment, only those TOC identifiers that are ±1 number of tracks from the mode will be used in combining the track offset range for each track to create the generic TOC identifier.

Generating a Generic TOC from a Single TOC

In another alternative embodiment, there may not be a statistically significant sample of TOC identifiers from which to create an aggregate TOC identifier. In a worst case example, only a single TOC identifier is mapped to a particular album. Here, there is no distribution of data points to build an effective set of offset ranges. Where such TOC identifier data is lacking for a particular album, therefore, embodiments of the present invention contemplate measuring the average offset range in use for some or all of the other TOC identifiers where a statistically significant sample is available. This average range may then be applied to each of the individual track offsets of the single TOC identifier to create a more generic TOC identifier. For example, a single TOC identifier associated with an album with no other known TOCs may have a Track 1 offset of 13,500 (3 minutes). Where there is a statistically significant TOC identifier sample (e.g., 1000 TOC identifiers), embodiments the present invention contemplate applying the average size offset range for all Track 1s (e.g., 1,000 (13 seconds)) to the track 1 offset of the single TOC identifier. In this example, the offset range used for track 1 of the single TOC identifier may be set from offset 13,000 to offset 14,000, making the offset range the same size as the average for all track 1s. This methodology enables the single data points of a singular TOC to be utilized for building a generic TOC enabling non-exact matching of many different input TOC identifiers.

Method for Altering a TOC

Figure 10:
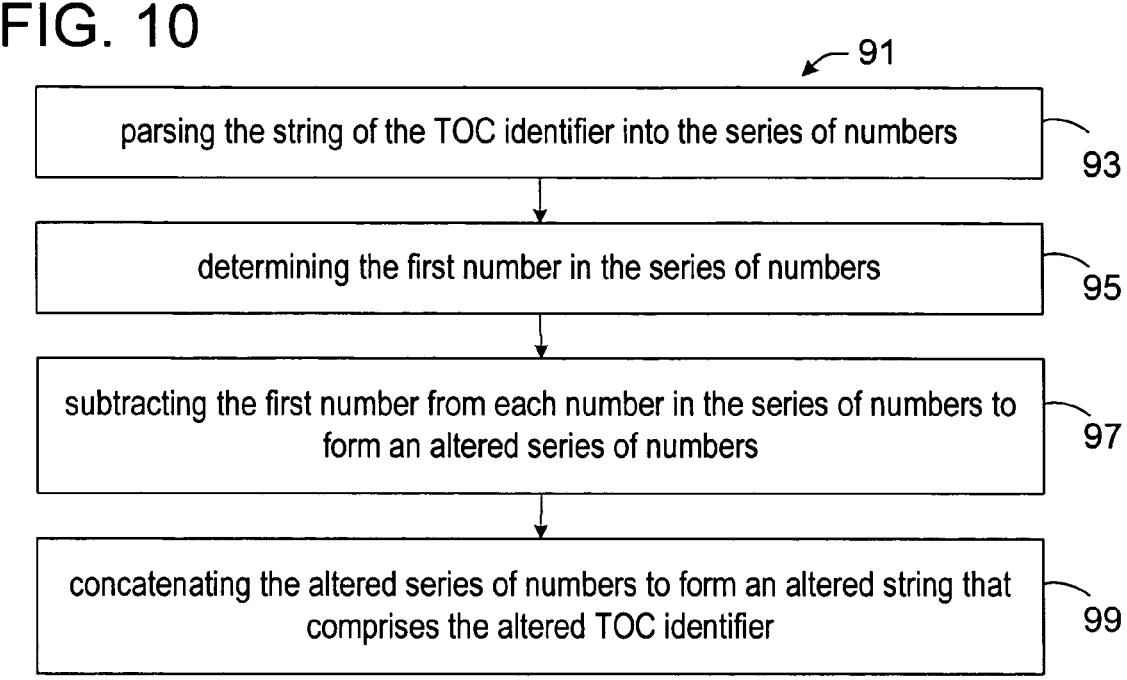
FIG. 10 is a flow diagram of a method of one embodiment of the invention.

A method for altering a TOC identifier, generally indicated 91 in FIG. 10, is directed to creating an altered TOC identifier which may be used to identify the contents of a compact disc. Such a TOC identifier comprises a string formed by concatenating a series of numbers together, each of the series of numbers corresponding to track offsets for each track on the compact disc, generally as set forth above. The method comprises parsing, at 93, the string of the TOC identifier into the series of numbers and determining, at 95, the first number in the series of numbers. The method further comprises subtracting, at 97, the first number from each number in the series of numbers to form an altered series of numbers and concatenating, at 99, the altered series of numbers to form an altered string that comprises the altered TOC identifier.

General Purpose Computing Device

Figure 11:
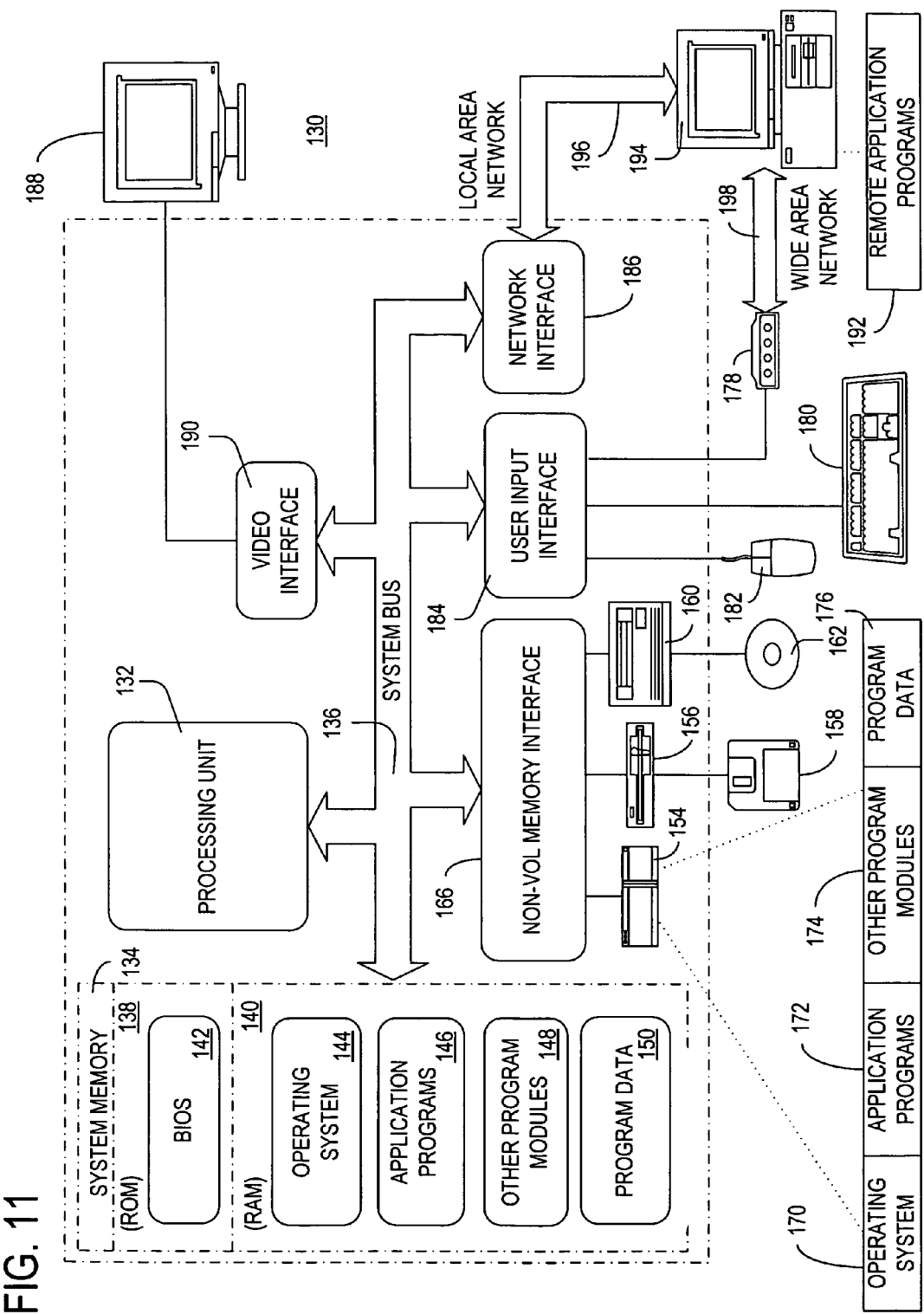
FIG. 11 is a block diagram illustrating one example of a suitable computing system environment in which one embodiment of the invention may be implemented.

FIG. 11 shows one example of a general purpose computing device in the form of a computer 130. In one embodiment of the invention, a computer such as the computer 130 is suitable for use in the other figures illustrated and described herein. Computer 130 additionally has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. In one example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/ or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 11 illustrates operating system 144, application programs 146, other program modules 148, and program data 150.

The drives or other mass storage devices and their associated computer storage media discussed above and illustrated in FIG. 11, provide storage of computer readable instructions, data structures, program modules and other data for the computer 130. In FIG. 11, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, camera, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown). In one example, the user interfaces discussed above may be embodied by such input devices and monitors.

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 11 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 11 illustrates remote application programs 192 as residing on the memory device. It will be appreciated that the network connections shown are exemplary and other means of establishing a communications link between the computers may be used.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the embodiments of the invention are operational with numerous other general purpose or special purpose computing system environments or configurations. The computing system environment is not intended to suggest any limitation as to the scope of use or functionality of the embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

In operation, computer 130 executes a computer-implemented method of operation on one or more data processing devices such as described above for identifying, by a computer, the contents of a compact disc. The computer 130 (or its components) receives a table of contents (TOC) identifier associated with a compact disc. The TOC identifier comprises a string formed by the concatenation of a number indicative of the number of tracks on the compact disc, a series of numbers corresponding to track offsets for each track of the compact disc, and a number indicative of the lead out value of the tracks on the compact disc. The computer 130 (or its components) parses the string into the number indicative of the number of tracks on the compact disc, the series of numbers corresponding to track offsets for each track of the compact disc, and a number indicative of the lead out value of the compact disc. The computer 130 (or its components) determines the first number from the series of numbers. The computer 130 (or its components) subtracts the first number from each number in the series of numbers to form an altered series of numbers. The computer 130 (or its components) concatenates the altered series of numbers to form an altered string that comprises the altered TOC identifier. The computer 130 (or its components) compares the altered TOC identifier to a plurality of canonical TOC identifiers, each of the canonical TOC identifiers associated with a particular album, to identify the contents of the compact disc.

Also in operation, computer 130 executes a computer-implemented method of operation on one or more data processing devices such as described above for generating, by a computer, a generic table of contents (TOC) identifier for a plurality of compact discs known to contain the same data. The generic TOC is adapted for matching with a TOC identifier stored on an unknown compact disc for identifying the contents of the unknown compact disc. The computer 130 (or its components) collects a plurality of TOC identifiers stored on a plurality of compact discs known to contain the same data. Each of the TOC identifiers comprising a string formed by the concatenation of a number indicative of the number of tracks on the compact disc, a series of numbers corresponding to track offsets for each track of the compact disc, and a number indicative of the lead out value of the tracks on the compact disc. The computer 130 (or its components) parses the string into the number indicative of the number of tracks on the compact disc, the series of numbers corresponding to track offsets for each track of the compact disc, and a number indicative of the lead out value of the compact disc. The computer 130 (or its components) aggregates each of the respective series of track offset numbers for each TOC identifier with the corresponding track offset numbers from the other of the plurality of collected TOC identifiers. The computer 130 (or its components) creates a track offset range for each track on the plurality of compact discs based upon the aggregated track offset population corresponding to each track. The computer 130 (or its components) combines the track offset range for each track to create the generic TOC identifier.

In further operation, computer 130 executes a computer-implemented method of operation on one or more data processing devices such as described above for altering, by a computer, a table of contents (TOC) identifier for a compact disc to create an altered TOC identifier which may be used to identify the contents of a compact disc. The TOC identifier comprises a string formed by concatenating a series of numbers together. Each of the series of numbers corresponds to track offsets for each track on the compact disc. The computer 130 (or its components) parses the string of the TOC identifier into the series of numbers. The computer 130 (or its components) determines the first number in the series of numbers. The computer 130 (or its components) subtracts the first number from each number in the series of numbers to form an altered series of numbers. The computer 130 (or its components) concatenates the altered series of numbers to form an altered string that comprises the altered TOC identifier.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above products and methods without departing from the scope of the invention, it is intended that all matter contained in the above description and shown in the accompanying drawings shall be interpreted as illustrative and not in a limiting sense.

APPENDIX A

The following is a structured query language user-defined function (SQL UDF) for converting a hexadecimal string to an integer string:

```
CREATE FUNCTION dbo.HexStrToInt (@hexnum varchar(6)) RETURNS int AS BEGIN
  DECLARE @i          int,
    @digits           int,
    @result           int,
    @current_digit    char(1),
    @current_digit_dec int
  SET @result = 0
  SELECT @digits = len(@hexnum)
  SET @i = 1
  WHILE @i <= @digits   BEGIN
    SELECT @current_digit = SUBSTRING(@hexnum, @i, 1)
    IF @current_digit in ('A','B','C','D','E','F')
      SELECT @current_digit_dec = ASCII(@current_digit) -
        ASCII('A') + 10
    ELSE
      SELECT @current_digit_dec = CAST(@current_digit AS INT)
    SELECT @result = (@result * 16) + @current_digit_dec
    SELECT @i = @i + 1
  END -- WHILE
  RETURN @result
END
select dbo.HexStrToInt('ABCD') -- returns 43981
```

What is claimed is:

1. A method for identifying the contents of a compact disc, said method comprising
receiving a table of contents (TOC) identifier associated with a compact disc, said TOC identifier comprising a string formed by the concatenation of a number indicative of the number of tracks on the compact disc, a series of numbers corresponding to track offsets for each track of the compact disc, and a number indicative of the lead out value of the tracks on the compact disc;
parsing said string into the number indicative of the number of tracks on the compact disc, the series of numbers corresponding to track offsets for each track of the compact disc, and a number indicative of the lead out value of the compact disc;
determining the first number from said series of numbers;
subtracting said first number from each number in said series of numbers to form an altered series of numbers;
concatenating said altered series of numbers to form an altered string that comprises the altered TOC identifier; and
comparing said altered TOC identifier to a plurality of canonical TOC identifiers, each of said canonical TOC identifiers associated with a particular album, to identify the contents of the compact disc.

2. A method as set forth in claim 1 further comprising rounding each of the numbers in the altered series of numbers before said concatenating and comparing.

3. A method as set forth in claim 2 wherein said rounding further comprises rounding up each of the numbers in the altered series of numbers before said concatenating and comparing.

4. A method as set forth in claim 2 wherein said rounding further comprises rounding an intertrack gap between each of the tracks to a value common with the intertrack gap of the canonical TOC identifiers.

5. A method as set forth in claim 1 wherein said receiving comprises receiving a TOC identifier from a user accessing the contents of the compact disc.

6. A method as set forth in claim 5 further comprising identifying the contents of the compact disc to the user.

7. A method as set forth in claim 6 wherein said identifying further comprises providing metadata associated with the compact disc to the user.

8. A method as set forth in claim 1 wherein said numbers are hexadecimal-based numbers.

9. A method as set forth in claim 8 further comprising converting the hexadecimal-based numbers of the TOC identifier to integer based numbers.

10. A method for generating a generic table of contents (TOC) identifier for a plurality of compact discs known to contain the same data, said generic TOC adapted for matching with a TOC identifier stored on an unknown compact disc for identifying the contents of the unknown compact disc, said method comprising:
   collecting a plurality of TOC identifiers stored on a plurality of compact discs known to contain the same data, each of said TOC identifiers comprising a string formed by the concatenation of a number indicative of the number of tracks on the compact disc, a series of numbers corresponding to track offsets for each track of the compact disc, and a number indicative of the lead out value of the tracks on the compact disc;
   parsing said string into the number indicative of the number of tracks on the compact disc, the series of numbers corresponding to track offsets for each track of the compact disc, and a number indicative of the lead out value of the compact disc;
   aggregating each of the respective series of track offset numbers for each TOC identifier with the corresponding track offset numbers from the other of the plurality of collected TOC identifiers;
   creating a track offset range for each track on said plurality of compact discs based upon said aggregated track offset population corresponding to each track; and
   combining the track offset range for each track to create the generic TOC identifier.

11. A method as set forth in claim 10 wherein said creating a track offset range for each track comprises utilizing the standard deviation of each aggregated track offset population to determine each respective range.

12. A method as set forth in claim 10 further comprising comparing said plurality of TOC identifiers before said parsing;
   identifying outlier TOC identifiers; and
   removing the identified outlier TOC identifiers from said parsing and said aggregating.

13. A method as set forth in claim 12 wherein said identifying outlier TOC identifiers comprises identifying those TOC identifiers where the number indicative of the number of tracks on the compact disc is different than the mode of the number indicative of the number of tracks on the compact disc for the plurality of TOC identifiers.

14. A method as set forth in claim 10 wherein said creating a track offset range for each track further comprises super-sampling said aggregated track offset population.

15. A method as set forth in claim 14 wherein said creating further comprises super-sampling the aggregated track offset population at a level of granularity larger than the granularity of the collected individual TOC identifiers.

16. A method as set forth in claim 15 wherein said creating a track offset range for each track further comprises creating a track offset range for each track of at least about $2/15$ of a second.

17. A method as set forth in claim 16 wherein said creating a track offset range for each track further comprises creating a track offset range for each track of at least about $1/3$ of a second.

18. A method as set forth in claim 10 wherein said aggregating further comprises weighting one or more of said aggregated track offset numbers according to the popularity of the respective TOC identifier.

19. A method as set forth in claim 10 wherein said creating a track offset range for each track on said plurality of compact discs further comprises creating two or more offset ranges for one or more of said tracks based upon said aggregated track offset population corresponding to each track.

20. A method for altering a table of contents (TOC) identifier for a compact disc to create an altered TOC identifier which may be used to identify the contents of a compact disc, said TOC identifier comprising a string formed by concatenating a series of numbers together, each of said series of numbers corresponding to track offsets for each track on the compact disc, said method comprising:
   parsing said string of the TOC identifier into said series of numbers;
   determining the first number in said series of numbers;
   subtracting said first number from each number in said series of numbers to form an altered series of numbers; and
   concatenating said altered series of numbers to form an altered string that comprises the altered TOC identifier.

* * * * *